United States Patent
Rigazio et al.

(10) Patent No.: US 6,513,004 B1
(45) Date of Patent: Jan. 28, 2003

(54) OPTIMIZED LOCAL FEATURE EXTRACTION FOR AUTOMATIC SPEECH RECOGNITION

(75) Inventors: Luca Rigazio, Santa Barbara, CA (US); David Kryze, Santa Barbara, CA (US); Ted Applebaum, Santa Barbara, CA (US); Jean-Claude Junqua, Santa Barbara, CA (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/449,053

(22) Filed: Nov. 24, 1999

(51) Int. Cl.[7] .......................... G10L 15/04; G10L 17/00; G10L 15/08

(52) U.S. Cl. .................. 704/254; 704/249; 704/236

(58) Field of Search ................................. 704/250, 255, 704/240–241, 500, 231; 358/400–430; 382/175, 200–250

(56) References Cited

U.S. PATENT DOCUMENTS

| | | | | |
|---|---|---|---|---|
| 4,805,219 A | * | 2/1989 | Baker et al. | 704/240 |
| 5,321,776 A | * | 6/1994 | Shapiro | 358/426 |
| 5,715,367 A | * | 2/1998 | Gillick et al. | 704/250 |
| 5,852,806 A | * | 12/1998 | Johnston et al. | 704/500 |
| 5,898,798 A | * | 4/1999 | Bouchard et al. | 382/175 |
| 5,926,791 A | * | 7/1999 | Ogata et al. | 704/500 |
| 6,058,205 A | * | 5/2000 | Bahl et al. | 704/231 |
| 6,289,131 B1 | * | 9/2001 | Ishikawa | 382/232 |

FOREIGN PATENT DOCUMENTS

EP  0 831 461 A2  3/1998

OTHER PUBLICATIONS

Long et al 1 ("Discriminant Wavelet Basis Construction for Speech Recognition", 5th Int'l Conference on Spoken Language Processing, ©Nov. 1998).*

Long et al2 ("Wavelet Based Feature Extraction For Phoneme Recognition", Fourth International Conference on Spoken Language Proceedings, Oct. 1996, pp. 264–267 vol. 1).*

Kryse et al.; "A New Noise–Robust Subband Front–End and its Comparison to PLP"; Keystone, Colorado; ASRU, 1999; Dec. 12–15, 1999. Entire Document.

Long et al.; "Discriminant Wavelet Basis Construction for Speech Recognition"; ICSLP, 1998; Nov. 30, 1998–Dec. 4, 1998; Sidney, Australia; pp. 1047–1049; entire document.

Chang et al.; "Speech Feature Extracted from Adaptive Wavelet for Speech Recognition"; Electronics Letters, IEE Stevenage, GB, vol. 34, No. 23; Nov. 12, 1998; pp. 2211–2213; entire document.

(List continued on next page.)

Primary Examiner—Richemond Dorvil
Assistant Examiner—Daniel A Nolan
(74) Attorney, Agent, or Firm—Harness, Dickey & Pierce, P.L.C.

(57) ABSTRACT

The acoustic speech signal is decomposed into wavelets arranged in an asymmetrical tree data structure from which individual nodes may be selected to best extract local features, as needed to model specific classes of sound units. The wavelet packet transformation is smoothed through integration and compressed to apply a non-linearity prior to discrete cosine transformation. The resulting subband features such as cepstral coefficients may then be used to construct the speech recognizer's speech models. Using the local feature information extracted in this manner allows a single recognizer to be optimized for several different classes of sound units, thereby eliminating the need for parallel path recognizers.

22 Claims, 5 Drawing Sheets

OTHER PUBLICATIONS

Long et al.; "Wavelet Based Feature Extraction for Phoneme Recognition"; Proceedings ICSLP, 1996; Fourth International Conference on Spoken Language Processing; Philadelphia, Pennsylvania; Oct. 3–6, 1996; pp. 264–267; vol. 1; entire document.

Tan et al.; "The Use of Wavelet Transforms in Phoneme Recognition"; Proceedings ICSLP, 1996; Fourth International Conference on Spoken Language Processing; Philadelphia, Pennsylvania; Oct. 3–6, 1996; pp. 2431–2434; vol. 4; entire document.

Erzin et al.; "Subband Decomposition Based Speech Recognition in the Presence of Car Noise"; Turkish Journal Electrical Engineering and Computer Sciencces, Elektrik; 1997; Sci. & Tech. Res. Council; Turkey, Turkey; vol. 5, No. 3; pp. 297–305.

C.J. Long and S. Datta, Department of Electrical and Electronic Engineering, Loughborough University, "Discriminant Wavelet Basis Construction for Speech Recognition". Nov. '98.

* cited by examiner

OPTIMIZED LOCAL FEATURE EXTRACTION FOR AUTOMATIC SPEECH RECOGNITION

BACKGROUND AND SUMMARY OF THE INVENTION

The present invention relates generally to speech recognition systems and more particularly to a wavelet-based system for extracting features for recognition that are optimized for different classes of sounds (e.g. fricatives, plosives, other consonants, vowels, and the like).

When analyzing a speech signal, the first step is to extract features which represent the useful information that characterizes the signal. Conventionally, this feature extraction process involves chopping the speech signal into overlapping windows of a predetermined frame size and then computing the Fast Fourier Transform (FFT) upon the signal window. A finite set of cepstral coefficients are then extracted by discarding higher order terms in the Fourier transform of the log spectrum. The resulting cepstral coefficients may then be used to construct speech models, typically Hidden Markov Models.

A significant disadvantage of conventional FFT analysis is its fixed time-frequency resolution. When analyzing speech, it would be desirable to be able to use a plurality of different time-frequency resolutions, to better spot the non-linearly distributed speech information in the time-frequency plane. In other words, it would be desirable if sharper time resolution could be provided for rapidly changing fricatives or other consonants while providing less time resolution for slower changing structures such as vowels. Unfortunately, current technology makes this difficult to achieve. While it is possible to construct and use in parallel a set of recognizers that are each designed for a particular speech feature, such solution carries a heavy computational burden.

The present invention employs wavelet technology that provides one analytical technique which covers a wide assortment of different classes of sounds. Using the wavelet technology of the invention, a single recognizer can be constructed and used in which the speech models have already been optimized for different classes of sounds through a unique feature extraction process. Thus the recognizer of the invention is optimized for different classes of sounds without increasing the complexity of the recognition analysis process.

For a more complete understanding of the invention, its objects and advantages, refer to the following specification and to the accompanying drawings.

DESCRIPTION OF THE PREFERRED EMBODIMENT

The local feature extraction system of the invention uses a wavelet decomposition of the acoustic waveform. Wavelet decomposition results in a way of representing acoustic information in terms of functions that are local in time and frequency. Wavelet decomposition is thus different from conventional Fourier series decomposition. In conventional Fourier analysis, the sines and cosines are local in frequency but global in time and space. A short pulse, for example, has slowly decaying coefficients that are hard to measure and represent using FFT's. To represent such a pulse, the Fourier series must depend heavily on cancellation. The whole of Fourier analysis, relating properties of functions to properties of coefficients, is made difficult by the non-local support provided by the sine wave function.

Given a vector space S, a basis is a set of vectors ($e_1, \ldots, e_n$) $e_i \in S$ that spans the space S. If $e_i$ is linearly independent from $e_j$ for $i \ne j$ the basis is called complete, and from linear algebra every vector $x \in S$ can be decomposed in the basis (and reconstructed) once a scalar product $<x,y>:S \to R$ is defined (R is the set of real numbers), as:

$$x = \sum_{i=1}^{n} \langle e_i, x \rangle e_i$$

where $<e_i,x>e_i$ is called the component of the vector along $e_i$, and the set of these $<e_i,x>e_i$, $i=1, \ldots, n$ is called the projection of the vector on basis ($e_1 \ldots, e_n$).

Functions, and therefore signals, are a vector space once a scalar product is defined as:

$$<f,g> = \int f(x)g(x)^* dx$$

where f, g are functions (or signals, mathematically these are two names for the same object) and g* is the adjoint of g. This means that it is possible to construct basis for a space of function, to project a function in such a basis and to reconstruct the signal using Equations 1 and 2.

Specifically, wavelet bases are constructed from the translation $W(x) \to W(x+b)$ and the dilation $W(x) \to W(ax)$ of a prototype function $W(x)$, called mother wavelet. Once the mother wavelet satisfies some basic properties a basis for a space of functions can be obtained by translating and dilating the mother wavelet, as explained before.

The goal is a new way to represent functions—especially functions that are local in time and frequency. If we compare with Fourier series, we can say that sines and cosines are perfectly local in frequency, but global in time or space.

The present invention utilizes wavelets to achieve local support in time and frequency. While there are a number of ways to perform wavelet decomposition, the presently preferred technique is to use a recursive algorithm based on the decomposition of the signal in its low-pass and high-pass components. Alternatively, an iterative process can be employed.

Figure 1:
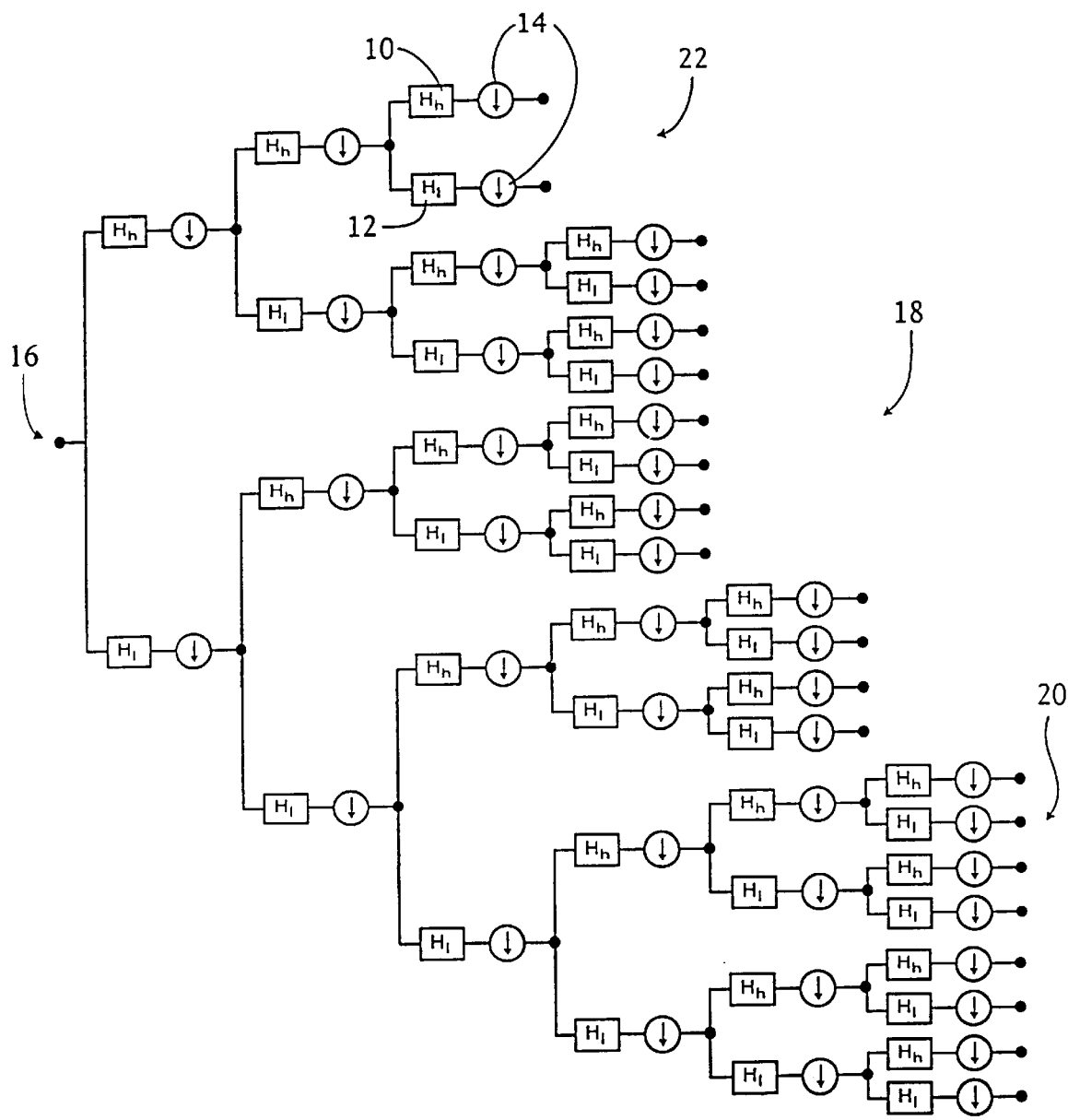
FIG. 1 is a conceptual hardware or software diagram illustrating a presently preferred embodiment for producing wavelet packet transforms of the acoustic speech signal.

By way of illustration, FIG. 1 shows how wavelet decomposition may be accomplished using low-pass and high-pass filters arranged in a cascading tree structure. Each node of the tree comprises an elementary block consisting of high-pass filter 10 and corresponding low-pass filter 12. Following each filter is a downsampling processor 14 to provide a non-redundant representation. The original signal is input at 16 and can be perfectly reconstructed from the subsignals by performing the reverse operation.

The system extracts local features in an optimized way by means of a hierarchical time-frequency resolution analysis. This analysis is achieved by developing the wavelet decomposition tree 18 in an unbalanced way. In this regard note that nodes appearing at the bottom of the tree, as at 20, represent a finer frequency resolution than nodes at the top of the tree, as at 22.

Figure 2:
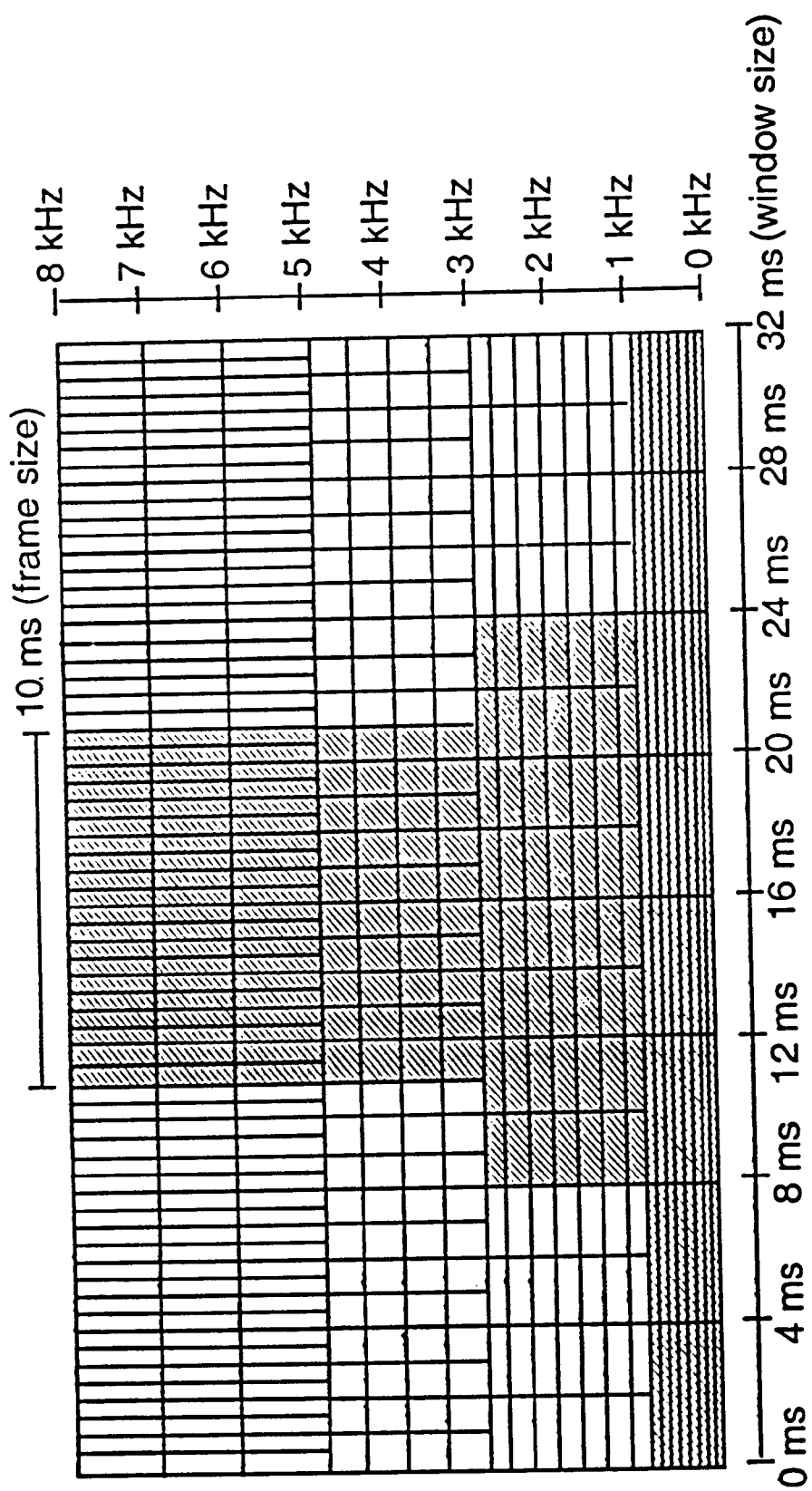
FIG. 2 illustrates a presently preferred time-frequency decomposition performed in the subband analysis.

The resulting decomposition of the time-frequency plane is illustrated in FIG. 2. For the lowest frequencies at the bottom of FIG. 2, between 0 and 1 kHz, where the highest frequency resolution is needed, the subsignals are obtained after passing through seven levels of filtering and downsampling. The corresponding wavelet length is 24 ms for a signal sampled (at 16 kHz) and the frequency resolution is 125 Hz. In contrast, for the highest frequencies (top of FIG. 2) above 6 kHz, where the speech information is less present and less detailed, the subsignals are obtained after passing through three levels of filtering and downsampling. The corresponding wavelet length is 3 ms and the frequency resolution is 1 kHz.

Figure 3:
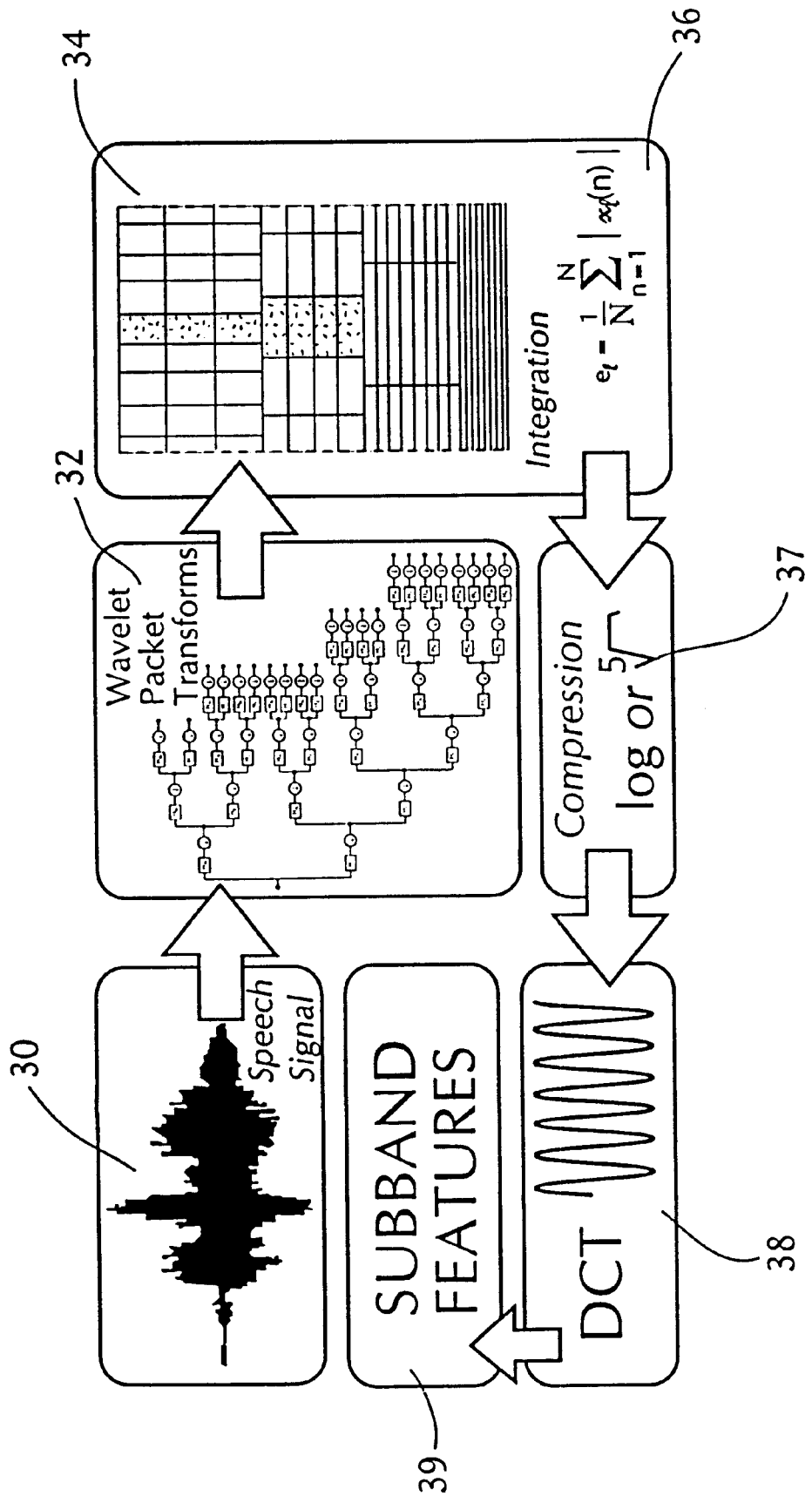
FIG. 3 is block diagram of the preferred embodiment for implementing subband feature extraction in accordance with the invention.

A presently preferred feature extraction system is illustrated in FIG. 3. The speech signal 30 is first supplied to the wavelet packet transform block 32 which decomposes the signal into wavelets in an unbalanced way as described in connection with FIG. 1. The processing of the speech signal 30 can be performed on a continuous basis by feeding the signal to the cascade filter-bank. The resulting wavelet transformation provides local support so that processing can be performed directly on the raw signal. In other words, there is no need to apply windowing techniques as is normally required with conventional FFT processing.

The presently preferred embodiment employs filters designed by convolving the frequency response of an ideal low-pass (or high-pass) filter with the frequency response of a Kaiser window of length 15 in order to minimize the rippling of the resulting filter. The objective is to obtain a steep transition between the passband and the stopband, so that minimal overlapping of filters is required. This, in turn, induces a reduced correlation at the filter-bank outputs. After computing the low-pass filters in this way, the high-pass filters are then determined using the impulse response sum to the discrete Dirac function.

In FIG. 3 the output of transform block 32 is illustrated at 34 as representing a time-frequency decomposition such as more fully illustrated in FIG. 2.

Figure 4:
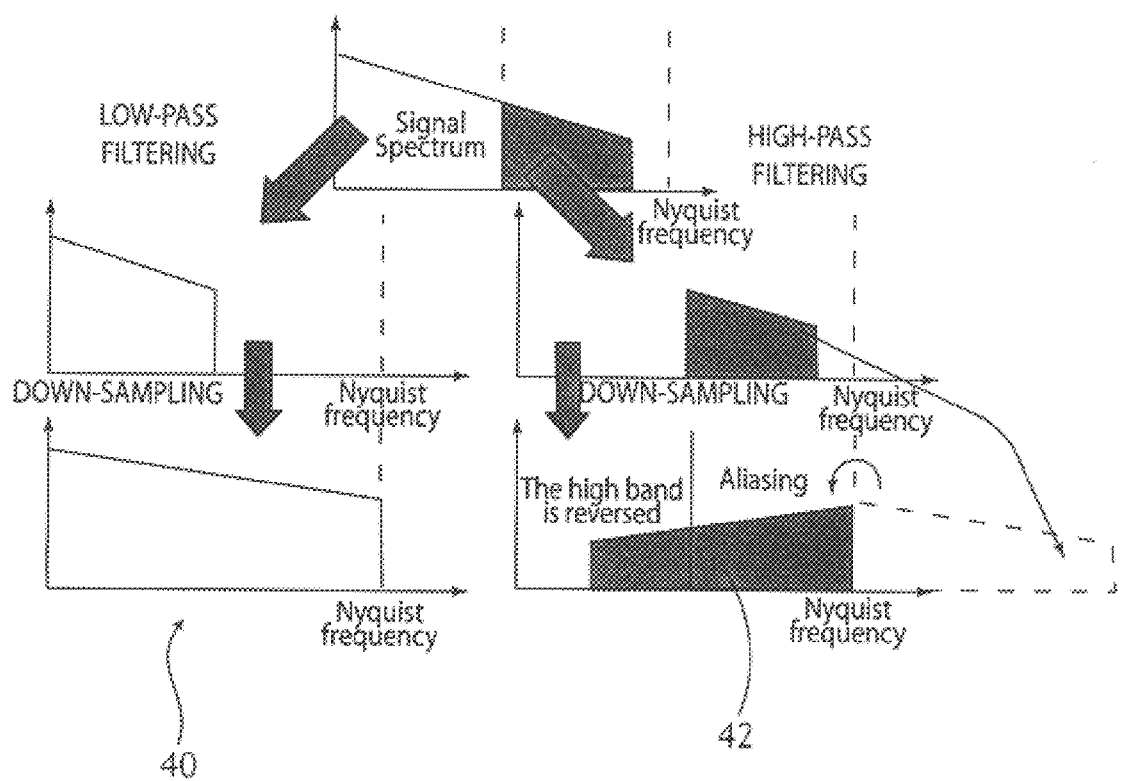
FIG. 4 illustrates a presently preferred technique for handling aliasing effects of the high pass filters.

While the output of the low-pass filter may be used directly after downsampling, the preferred embodiment performs additional processing on the output of the high-pass filter to reverse certain aliasing effects (the so-called "Gray code" effect). FIG. 4 illustrates the aliasing scheme. Note that the low-pass filtering and downsampling steps produce a range of frequencies from the null frequency up to the Nyquist frequency. This is illustrated generally at 40. In contrast, after high-pass filtering and downsampling, the spectrum that remains in the frequency range located between the null frequency and the Nyquist frequency is the mirror image of the high-band spectrum of the filtered signal. Thus, to extract the high band of the high band (applying two high-pass filters one after the other) it is necessary to take the low-band of the output of the high-pass filter. This results in unwanted inverting of the high-pass and low-pass filters after a high-pass filter operation.

To compensate, the preferred embodiment performs an inversion operation for every filtering stage beneath the high-pass filtering stage until another high-pass filtering stage is performed. The combined effect of two successive aliases will cancel each other. In FIG. 4 the reversed high-band is shown at 42.

Once aliasing is corrected, the outputs of the leaf filters are smoothed by performing an integration process depicted by block 36. For each subband l, the system computes on the corresponding subsignal $x_l(n)$ the average magnitude (if $\alpha$=1) or average energy (if $\alpha$=2) called $e_l$:

$$e_l = \frac{1}{N}\sum_{n=1}^{n} |x_l(n)|^{\alpha}, l = 1, 2, \ldots, L \quad \text{Equation 1}$$

The above average is computed over the same number N of coefficients for each subband. As the sample rate is divided by two for each step down the tree structure, the hierarchical time resolution is preserved as illustrated in FIG. 2. The size of the larger averaging window (corresponding to the lowest subband) is called the window size. The averaging window is then shifted by the size of a frame to deliver subband amplitudes at frame rate. The number N of averaged subsignal samples can be adjusted for the highest subbands so that the averaging window time extension is never smaller than one frame. Next, as illustrated at block 37, a compression operation is performed. The type of compression operation performed may depend on the nature of the speech signal. For clean speech a non-linear log operation is performed. For noise corrupted speech a root compression operation may be used instead. Either of these operation apply a non-linearity to $e_l$. While the above log operator is presently preferred, other non-linear operations may be applied instead.

Cepstral coefficients are extracted, as in block 38, by applying a discrete cosine transform (DCT) as in Equation 2:

$$c_k = \sum_{l=1}^{L} \log(e_l)\cos\left(\frac{k(l-0.5)}{L}\pi\right), k = 0, 1, \ldots, K \quad \text{Equation 2}$$

The result is a set of subband features 39 that may be used to represent the original speech signal 30 when constructing speech models such as Hidden Markov Models.

The subband analysis provides many degrees of freedom. In essence, any of the nodes within the filter bank tree can be selected to provide the time-frequency decomposition for a particular class of sounds. In other words, it is not necessary that only the leaf nodes are used in the wavelet decomposition. Rather, any combination of leaf nodes and intermediate nodes may be used. The selection of which nodes to use for a particular class of sounds (e.g. fricatives, plosives, other consonants, vowels, and the like) is how the local feature extraction system provides optimal results for these different classes of sounds.

The process for discovering which combination of nodes works best for a given class of sounds is an iterative one that works essentially as follows.

Figure 5:
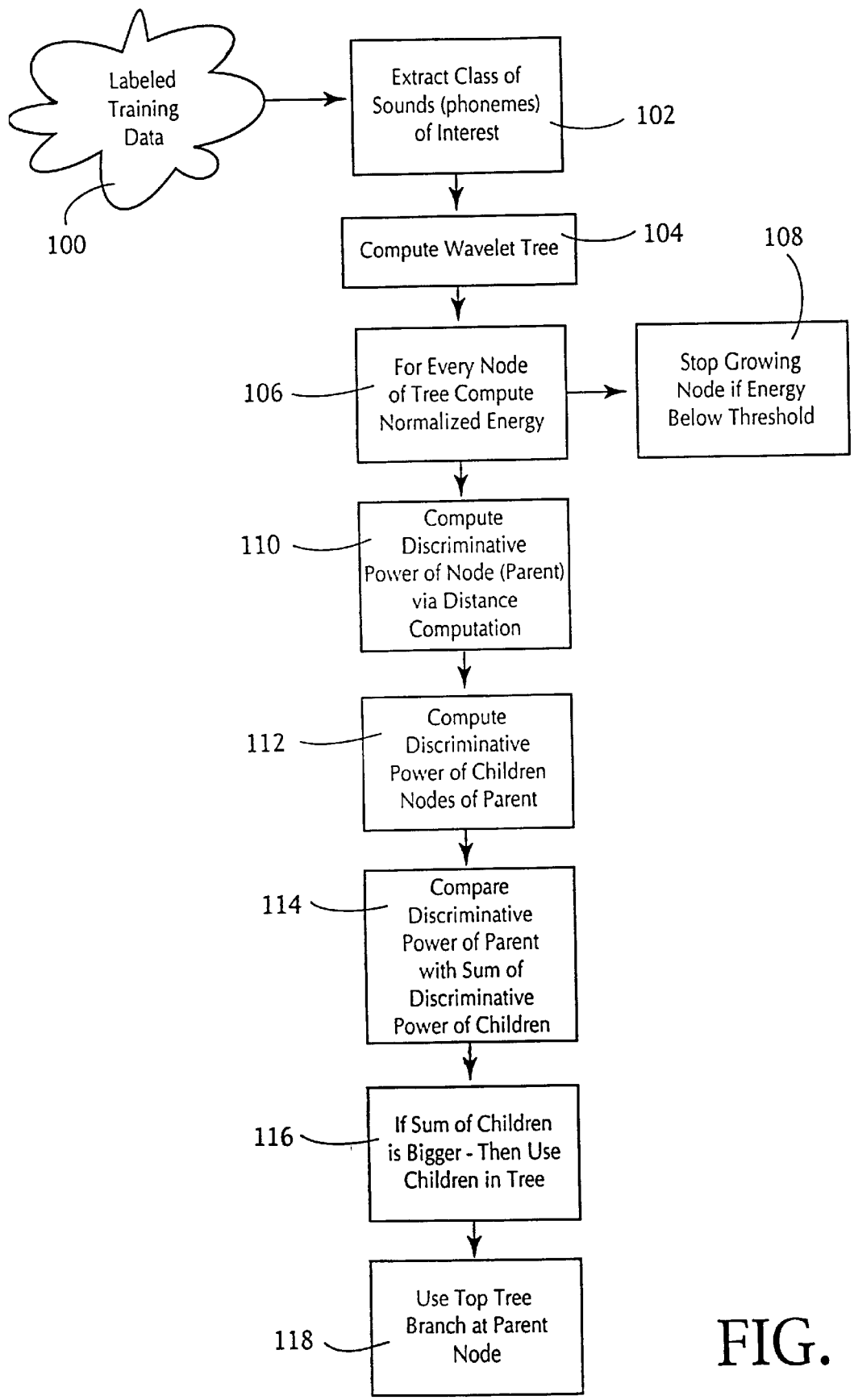
FIG. 5 is a flowchart illustrating a procedure for selecting the optimal wavelet tree for a particular class of sounds.

Referring to FIG. 5, the procedure for selecting the optimal tree structure for a given class of sounds operates upon a corpus of labeled data 100. The first step (step 102) is to extract from the labeled data the class of sounds of interest. Thus, if the tree is to be optimized for fricatives, all phonemes representing fricatives are extracted from the labeled training data. Then the wavelet tree is computed at 104, essentially as described previously. After the tree is computed, the next steps essentially determine how to best prune that tree to optimally match the class of sounds under consideration. The illustrated procedure proceeds to examine each node in a recursive or iterative fashion.

Thus, at step 106 for each node of the tree a normalized energy is computed. The energy (or a transformation of the energy) is normalized by appropriate scaling so that the sum of all energies for all nodes equals 1. If the energy at the current node under test is below a predetermined threshold, as tested at 108, the tree-pruning algorithm discards that node and all of its children. Otherwise, the node is further examined by computing its discriminative power using a suitable distance computation. This is illustrated at step 110. Thereafter, a similar discriminative power computation is made of all children nodes of that parent node, as indicated at step 112.

With the discriminative power of the parent and children nodes now computed, step 114 compares the discriminative power of the parent with the sum of the discriminative power of the children. As indicated at step 116, if the sum of the children is greater than that of the parent, then the children nodes are included in the tree. Otherwise, step 118, the tree is pruned by discarding the children nodes and any offspring of those children nodes.

The procedure illustrated in FIG. 5 proceeds until each node has either been tested as described or excluded by virtue of being the child of an excluded node. The result is a wavelet tree that has been optimally pruned for the class of sounds under consideration. After having developed one tree in this fashion, the system can continue to develop other trees (with different prunings) for other classes of sounds.

Different trees can be optimized to discriminate between a certain group of sounds. The trees are all extracted from an overgrown tree, so that only one decomposition is needed, with the nodes corresponding to the optimal subtrees being used to compute the desired features.

Specialized Hidden Markov Models can be trained on each of these specialized features. For instance, a set of specialized models that discriminate vowels from consonants may be constructed from specialized features optimized to get high discrimination between such sounds.

Coarse-to-fine resolution of the modeling can thus be achieved by recognizing broad classes first (for instance consonant versus vowels) and then recognizing particular sounds within a class, in a multi-pass recognition paradigm. Alternatively, all models (both fine resolution and coarse resolution) may be used together in a one-pass system to generate a sequence of broad and fine sounds that provides information about the utterance.

While the invention has been described in its presently preferred form, it will be understood that the invention is capable of being implemented in a variety of different ways without departing from the spirit of the invention as set forth in the appended claims.

What is claimed is:

1. A method of extracting features for automatic speech recognition, comprising:
   decomposing an acoustic speech signal using a set of wavelets, where the set of wavelets is organized into a set of subsignals in a data structure having a plurality of frequency subband nodes;
   computing the average magnitude of each subsignal respective to each node;
   defining and selecting a wavelet basis to enhance discrimination of particular classes of sounds; and
   applying said basis to said set of wavelets to generate from said computed average magnitudes a plurality of decomposition coefficients representing features extracted from said acoustic speech signal.

2. The method of claim 1 further comprising expressing said set of wavelets as decomposition coefficients and subsequently processing said coefficients to decorrelate and compress them.

3. The method of claim 1 wherein the acoustic speech signal is sampled and represented in digital form.

4. The method of claim 1 wherein said set of wavelets is organized into a tree structure.

5. The method of claim 4 wherein said tree structure is a binary tree structure obtained from a combination of basic processing blocks.

6. The method of claim 5 wherein said basic processing blocks perform high-pass and low-pass filtering followed by downsampling.

7. The method of claim 4 wherein said tree structure defines a plurality of leaf nodes each providing decomposition coefficients.

8. The method of claim 4 wherein said tree structure defines a root node and wherein said method further comprises continuously feeding said acoustic speech signal into said root node.

9. The method of claim 4 wherein said tree structure defines a plurality of leaf nodes that are selected to maximize the discrimination of a predetermined class of sounds.

10. The method of claim 1 further comprising integrating said decomposition coefficients over a time window.

11. The method of claim 1 further comprising performing a non-linear operation on said decomposition coefficients.

12. The method of claim 11 wherein said non-linear operation includes compressing the decomposition coefficients.

13. The method of claim 1 further comprising performing a discrete cosine transform on selected ones of said nodes to thereby extract cepstral coefficients.

14. The method of claim 1 further comprising selecting a portion of said nodes by computing a value indicative of energy at each node and pruning a node if the computed value is below a predetermined threshold.

15. The method of claim 14 wherein said value indicative of energy is a compressed energy.

16. The method of automatic speech recognition according to claim 1, comprising generating a first plurality of decomposition coefficients to represent a first class of sounds and generating a second plurality of decomposition coefficients to represent a second class of sounds and using said first and second plurality of decomposition components to generate first and second sets of specialized models for use in speech recognition.

17. The method of claim 16 wherein said first and second sets of models are used in a multi-pass configuration whereby the first sets of models are used first with the recognition results thereafter being processed using the second sets of models.

18. The method of claim 16 wherein said first and second sets of models are used concurrently to supply recognition results corresponding to both said first and second classes of sounds.

19. The method of claim 19 wherein said first class of sounds corresponds to a first level of discrimination between broad classes of sounds and wherein said second class of sounds corresponds to a second level of discrimination between narrow classes of sounds.

20. A method of extracting features for automatic speech recognition, comprising:
   decomposing an acoustic speech signal using a set of wavelets, where the set of wavelets is organized into a tree structure having a plurality of nodes;
   defining and selecting a wavelet basis to enhance discrimination of particular classes of sounds, including selecting a portion of said nodes by computing the discriminative power of a first one of said nodes, further computing the discriminative power of the child nodes of said first one of said nodes and pruning said child nodes if the sum of the discriminative powers of said child nodes is less than the discriminative power of said first one of said nodes; and applying said basis to said set of wavelets to generate a plurality of decomposition coefficients representing features extracted from said acoustic speech signal.

21. A method of extracting features for automatic speech recognition, comprising:

decomposing an acoustic speech signal using a set of wavelets, where the set of wavelets is organized into an unbalanced tree structure, such that speech signals at lower frequencies undergo filtering at a higher frequency resolution than speech signals at higher frequencies;

defining and selecting a wavelet basis to enhance discrimination of particular classes of sounds; and applying said basis to said set of wavelets to generate a plurality of decomposition coefficients representing features extracted from said acoustic speech signal.

22. The method of claim 21 wherein said tree structure is a binary tree structure obtained from a concatenation of basic processing blocks and said basic processing blocks perform high-pass and low-pass filtering followed by down-sampling.

* * * * *

UNITED STATES PATENT AND TRADEMARK OFFICE
CERTIFICATE OF CORRECTION

PATENT NO.    : 6,513,004 B1
DATED         : January 28, 2003
INVENTOR(S)   : Rigazio et al.

It is certified that error appears in the above-identified patent and that said Letters Patent is hereby corrected as shown below:

Column 6,
Line 49, "19" (2nd occurrence) should be -- 16 --.

Signed and Sealed this

Eleventh Day of May, 2004

JON W. DUDAS
*Acting Director of the United States Patent and Trademark Office*